(No Model.) 2 Sheets—Sheet 2.
H. A. SEYMOUR.
AUTOMATIC SPEED CONTROLLER FOR ELECTRIC CARS.
No. 562,925. Patented June 30, 1896.
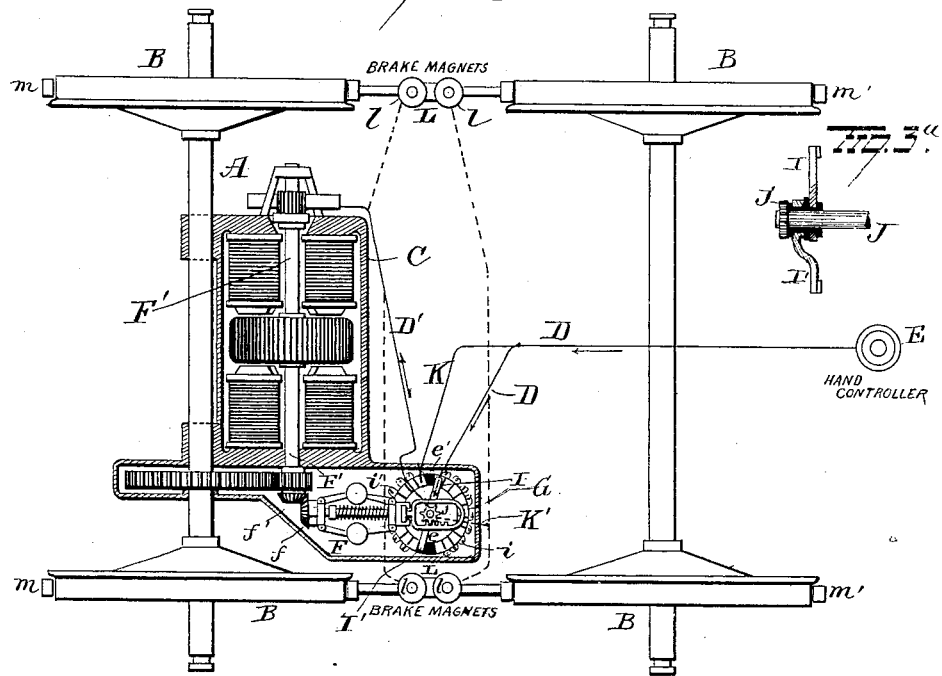
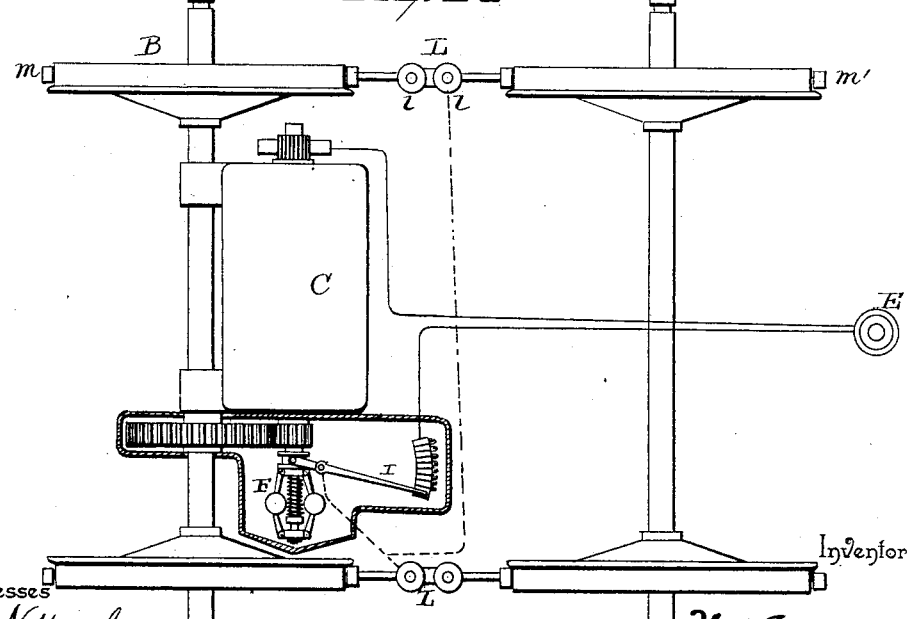
Witnesses
E. J. Nottingham
G. F. Downing
Inventor
H. A. Seymour

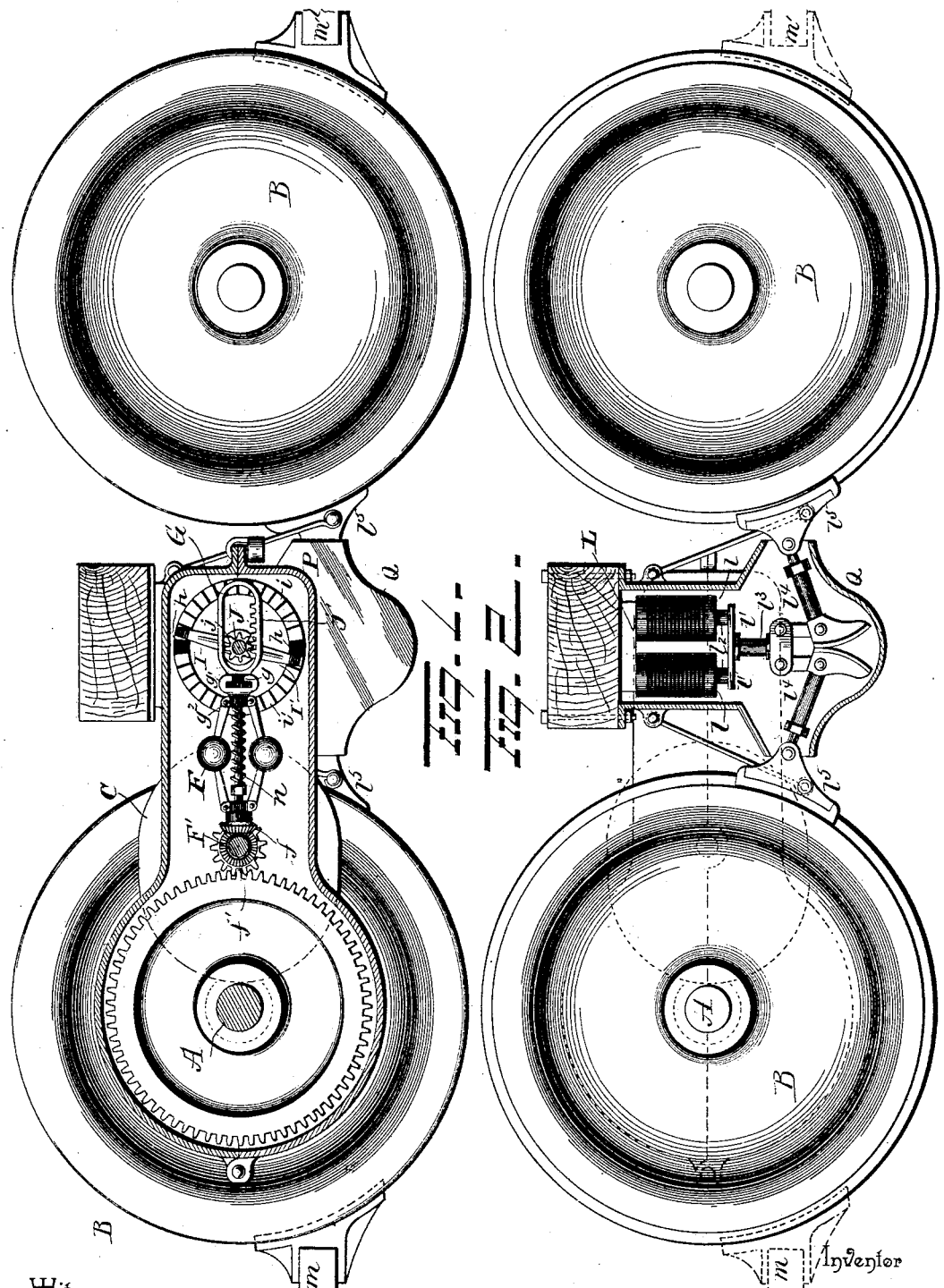

UNITED STATES PATENT OFFICE.

HENRY A. SEYMOUR, OF WASHINGTON, DISTRICT OF COLUMBIA.

AUTOMATIC SPEED-CONTROLLER FOR ELECTRIC CARS.

SPECIFICATION forming part of Letters Patent No. 562,925, dated June 30, 1896.

Application filed May 19, 1896. Serial No. 592,160. (No model.)

*To all whom it may concern:*

Be it known that I, HENRY A. SEYMOUR, of Washington, in the District of Columbia, have invented certain new and useful Improvements in Automatic Speed-Controllers for Electric Cars; and I do hereby declare the following to be a full, clear, and exact description of the invention, such as will enable others skilled in the art to which it appertains to make and use the same.

My invention relates to an improvement in automatic speed-controllers for electric cars. In the operation of electric cars experience has shown that by far the greater proportion of accidents are due to the excessive speed at which the cars are run. In spite of every effort that is made to enforce city ordinances which prohibit the running of electric cars faster than a safe and predetermined speed, still accidents are of frequent occurrence, and in the nature of things will continue to occur so long as it is within the power of reckless, careless, and inefficient motormen to operate cars at a speed in excess of that which may be fixed upon as a maximum for safe running.

The object of my invention is to provide an electrically-propelled car or electric locomotive with an automatic speed-controller which is not subject to the control of the motorman and which will under all circumstances and conditions of load, current, and grade automatically restrict the speed of the car to any predetermined rate and limit that may be decided upon as being safe and desirable.

With this object in view my invention consists, in an electrically-propelled car or electric locomotive, in the combination, with an electrically-actuated brake, of means for automatically actuating and gradually applying the brake and reducing the speed of the car whenever it is in excess of a fixed and predetermined maximum speed.

My invention further consists, in an electrically-propelled car or electric locomotive, in the combination, with an electrically-actuated brake, of means for automatically actuating the brake when the speed of the car becomes abnormally high, and for gradually checking the speed until it is reduced to its fixed and predetermined maximum.

My invention further consists, in an electrically-propelled car or electric locomotive, in the combination, with an electrically-actuated brake, of means for automatically actuating the brake and reducing the speed of the car whenever it is in excess of a fixed and predetermined maximum limit, and for automatically and gradually releasing the brake when the speed shall have been reduced to the desired limit.

My invention further consists, in an electrically-propelled car or electric locomotive, in the combination, with an electrically-actuated brake, of means for automatically and gradually applying the brake whenever the speed of the car is in excess of a predetermined limit, and for automatically and gradually releasing the brake whenever the speed of the car is reduced to or below its predetermined maximum limit.

My invention further consists in certain other features of improvement and combinations of parts, as will be hereinafter described, and pointed out in the claims.

In the accompanying drawings, Figure 1 is a view in side elevation of one embodiment of my invention. Fig. 2 is a view in side elevation of the electric brake mechanism. Fig. 3 is a diagrammatic view of the circuits and connections. Fig. 3ª is a detailed view of the contact-arms, and Fig. 4 is a modification.

A are the axles, and B the wheels, of a four-wheel truck such as are now being applied to electric locomotives or cars.

C is an electric motor, which may be mounted upon the truck-frame and geared with the axle in any desired manner. Currrent is supplied to the motor through circuit D D', in which is included the ordinary hand-controller E.

F is a centrifugal speed-governor, which may be of any desired type or construction, and which, in the present instance, is driven by a bevel-wheel $f$, gearing with a bevel-wheel $f'$, fastened to the armature-shaft F'. A yoke G is provided at one end with a groove $g$, in which engages a fork $g'$, formed on the sliding sleeve $g^2$, attached to the arms of the governor, and hence as the governor-balls recede from and approach each other the yoke will be reciprocated in opposite directions.

$i\ i'$ are two sets of contact-plates and resistances insulated from one another by the insulating strips or blocks $h$. Contact-arms I I' are secured at their inner ends to the central shaft J, but are insulated from each other. The outer ends of the contact-arms I I' move over and make contact with the two series of contact-plates $i\,i'$ of said resistances. To shaft J is fastened a pinion $j$, with which meshes a rack-bar $j'$, formed on one of the arms of the yoke G.

Motor-circuit D is electrically connected at one end with the hand-controller E and at its opposite end with the contact-plate $e$ of the set of resistances $i$, while the other section D' of the motor-circuit is electrically connected at one end with the inner end of the contact-arm I and its opposite end with the motor C. Hence under normal conditions, and when the car is running at or below its prescribed maximum speed, current is supplied to the motor through circuit D, contact-plate $e$, contact-arm I, and circuit D'.

K K' are the two sections of the brake-circuit, circuit-section K being electrically connected at one end with motor-circuit D, or with the controller, and at its opposite end with the contact-plate $e'$ of the set of resistances $i'$. The other section, K', of the brake-circuit is electrically connected at one end with the inner end of the contact-arm I', and at its opposite end may be connected either with the motor-circuit D' or with some portion of the truck-frame through which current may flow to the track or to the negative conductor in the event a return metallic circuit is employed.

Included in the brake-circuit are electro-magnets or solenoids L, each of which is preferably composed of two helices $l\,l$, connected in series. To the cross-bar $l'$, attached to the cores $l^2$, is connected a rod $l^3$, through which power is transmitted to the toggle-levers $l^4$ and from thence to the brake-shoes $l^5$. This brake mechanism, it will be noted, is separate and distinct from the hand brake mechanism, the brake-shoes of which are represented at $m\,m'$. While I have represented but one electric brake mechanism, it will be understood that a similar brake may be employed between the wheels on the opposite side of the car and that both magnets will be included in the same brake-circuit.

The governor and rheostat are mounted within a casing formed integral with or connected to the motor-casing, whereby the gearing and other parts of the automatic controller are always maintained in proper working relation to the motor. A door or cover P is provided to allow of access to and the adjustment of the governor and rheostat, and to allow of such parts being protected against unwarranted manipulation or injury. The brake mechanism is also inclosed in a suitable casing Q, which is provided with a door or cover (not shown) to allow of access to any portion of the mechanism, and which may be locked to prevent any tampering with the nuts or other adjustable parts of the brake. The object is to so protect all of the parts of the automatic speed-controller that when once adjusted for a certain prescribed maximum speed it will not be within the power of any unauthorized person to vary such adjustment and increase or change the speed at which the car may be operated.

When the car is being operated at or below its prescribed maximum speed, the electric brake mechanism will not be called into operation. Under such conditions the brake-shoes $l^5$ will be retained out of contact with the car-wheels by the weight of the toggle-levers, or by means of springs, if desired. The spring $n$ of the governor is so adjusted that the governor-balls will not fly outward until the car has attained a certain rate of speed, which for the sake of illustration we will assume is fixed at the rate of ten miles per hour. In the event the car attains a speed exceeding ten miles per hour, due either to the carelessness or recklessness of the motorman in supplying an excessive amount of current to the motor, or to his failure to properly apply the brakes in running downgrade, or to any other cause, the governor-balls will gradually recede from one another, with the result that the contact-arms I I' will be rotated and operate to gradually switch resistance into the motor-circuit and reduce the supply of current to the motor and at the same time gradually switch resistance out of the brake-circuit and gradually energize and strengthen the brake-magnets and cause them to apply the brakes which are actuated thereby. By gradually applying the brakes the danger of breaking or injuring the brake mechanism is greatly lessened, while the occupants of the car are protected against the discomfort and danger resulting from the sudden or violent checking of the speed of the car. As the speed of the car is gradually reduced the governor-balls will move toward one another and rotate the contact-arms of the resistances in the opposite direction, and thereby gradually release the brake mechanism and at the same time gradually strengthen the current flowing to the motor. It will thus be observed that the speed-controller operates gradually in applying and in releasing the brakes, and thereby insures a perfectly smooth and even running of the car.

Fig. 4 represents a modification in which the resistances in the motor-circuit are dispensed with, the automatic regulation and control of the speed being effected solely by the electric brake mechanism and without varying the supply of current to the motor.

It is evident that the automatic controlling mechanism may be applied to the regular hand brake mechanism, thereby rendering the employment of the supplemental brake mechanism unnecessary, and, further, that the construction and relative arrangement of the parts may be widely varied without departing from the spirit and scope of the invention. Hence I would have it understood that I do not restrict my invention to the particular construction and arrangement of parts shown and described; but, Having fully described my invention, what I claim as new, and desire to secure by Letters Patent, is—

1. In an electrically-propelled car, the combination with electrically-actuated brake mechanism, and a speed-governor, of means governed and controlled by the speed-governor for automatically actuating and gradually applying the brake whenever the car attains a speed in excess of a predetermined maximum rate of speed, substantially as set forth.

2. In an electrically-propelled car, the combination with an electrically-actuated brake and a speed-governor, of means governed and controlled by the speed-governor for automatically actuating and applying the brake whenever the car has attained a speed in excess of a predetermined maximum rate of speed, and for automatically and gradually releasing the brake until the speed of the car shall have been reduced to its predetermined maximum rate of speed, substantially as set forth.

3. In an electrically-propelled car, the combination with friction brake mechanism and an electromagnet for actuating and applying the brake, of a speed-governor, a series of resistances, and means, whereby the resistances are gradually switched out of the brake-circuit and the brake is applied with a gradually-increasing force, whenever the car attains a speed in excess of a predetermined maximum rate of speed, substantially as set forth.

4. In an electrically-propelled car, the combination with an electric motor and its circuit, friction brake mechanism, and an electromagnet for actuating and applying the brake, of a speed-governor and two sets of resistances, the parts being so constructed that whenever the car attains a speed in excess of a predetermined maximum rate of speed the supply of current to the motor will be gradually decreased, while the supply of current to the brake-magnet will be gradually increased, substantially as set forth.

5. In an electrically-propelled car, the combination with an electromotor for propelling the car, a speed-governor, and an electrically-actuated brake mechanism, of resistance and suitable means actuated and controlled by the speed-governor, for automatically and gradually reducing the flow of current to the electric motor and for gradually increasing the flow of current to the brake-electromagnet, whenever the car attains a speed in excess of a predetermined maximum speed, and for automatically and gradually increasing the flow of current to the motor and gradually reducing the flow of current to the brake-magnet as the speed of the car is checked and until it shall have been reduced to the predetermined maximum rate of speed, substantially as set forth.

6. In an electrically-propelled car, the combination with a speed-governor arranged to be operated by the armature-shaft, and an electric brake mechanism, of two sets of resistances, one included in the motor-circuit and the other in the electric-brake circuit, and means connected with the governor for automatically and simultaneously actuating the contact-arms of both sets of resistances, substantially as set forth.

7. In an electrically-propelled car, the combination with a speed-governor, of an electric brake mechanism constructed and adapted to operate independently of the regular hand-actuated brake mechanism, and means for automatically and gradually actuating and applying the electric brake mechanism whenever the car attains an abnormally high rate of speed.

8. In an electrically-propelled car, the combination with a speed-governor, of a friction brake mechanism located between the wheels of a truck, a solenoid for applying the brake-shoes to both wheels, a resistance, and means actuated and controlled by the speed-governor for automatically and gradually switching resistance into and out of the circuit through which current flows to said solenoid, substantially as set forth.

9. In an electrically-propelled car, the combination with a speed-governor, of brake mechanism located between the wheels on opposite sides of the truck, a solenoid connected with each brake mechanism, a resistance included in circuit with both solenoids, and means actuated and controlled by the speed-governor for automatically and gradually switching resistance into and out of the circuit through which current flows to said solenoids, substantially as set forth.

10. In an electrically-propelled car, the combination with an electric motor and its casing, of a speed-governor and set of resistances mounted in or upon said motor-casing, and brake mechanism having its brake-magnet in circuit with said resistances, substantially as set forth.

In testimony whereof I have signed this specification in the presence of two subscribing witnesses.

HENRY A. SEYMOUR.

Witnesses:
GEO. F. DOWNING,
S. G. NOTTINGHAM.